United States Patent
Nelson et al.

(10) Patent No.: US 7,545,325 B1
(45) Date of Patent: Jun. 9, 2009

(54) METHOD OF SIGNAL PROCESSING

(75) Inventors: Douglas J. Nelson, Columbia, MD (US); David C. Smith, Columbia, MD (US)

(73) Assignee: United States of America as represented by the Director, The National Security Agency, Washington, DC (US)

( * ) Notice: Subject to any disclaimer, the term of this patent is extended or adjusted under 35 U.S.C. 154(b) by 172 days.

(21) Appl. No.: 11/703,040

(22) Filed: Feb. 6, 2007

(51) Int. Cl.
*G01S 1/24* (2006.01)

(52) U.S. Cl. .................. 342/387; 342/442; 342/463

(58) Field of Classification Search .......... 342/109
See application file for complete search history.

(56) References Cited

U.S. PATENT DOCUMENTS

| | | | |
|---|---|---|---|
| 6,636,174 B2 | 10/2003 | Arikan et al. | |
| 6,677,893 B2* | 1/2004 | Rideout et al. | 342/353 |
| 7,304,314 B2* | 12/2007 | Zaugg | 250/458.1 |
| 7,365,682 B2* | 4/2008 | Ray | 342/387 |
| 2002/0126046 A1* | 9/2002 | Counselman et al. | 342/464 |
| 2005/0151093 A1* | 7/2005 | Zaugg | 250/458.1 |
| 2007/0296631 A1* | 12/2007 | Ray | 342/387 |
| 2008/0043574 A1* | 2/2008 | Rooney et al. | 367/87 |

OTHER PUBLICATIONS

Thibos, Larry N., Begin reading Fourier Analysis for begineers, 2003, http://research.opt.indiana.edu/Library/FourierBook/ch12.html.*
U.S. Appl. No. 10/996,462, filed Jul. 14, 2005, Zaugg.
U.S. Appl. No. 11/180,811, filed Apr. 20, 2006, Arikan et al.
Stein, Seymour; "Algorithms for Ambiguity Function Processing"; IEEE Trans. Acoust., Speech and Signal Processing, vol. ASSP-29, No. 3; Jun. 1981.

* cited by examiner

*Primary Examiner*—Thomas H Tarcza
*Assistant Examiner*—Timothy A Brainard
(74) *Attorney, Agent, or Firm*—Jennifer P. Ferragut; Robert D. Morelli

(57) ABSTRACT

The present invention is a method of finding propagation time and velocity of a transmitter. Specifically, receiving a signal at two or more receivers and using the scalar time relationship to determine propagation time and velocity of the transmitter for the purpose of location of the transmitter. This method is useful for both narrowband and broadband applications with increased accuracy over previous methods.

8 Claims, 2 Drawing Sheets

METHOD OF SIGNAL PROCESSING

FIELD OF THE INVENTION

The present invention relates to a directive radio wave method and, more specifically, to a directive radio wave method for use with at least one satellite.

BACKGROUND OF THE INVENTION

Doppler is a familiar phenomenon in which the frequency of a received signal appears to change as the radial velocity between the transmitter and receiver changes. Historically, this change in frequency has been modeled as a translation in frequency, but, as we will show, this model is not correct. The correct model is that Doppler results in a change of scale of the time axis of the signal.

Perhaps the first application of the Doppler equation was the measurement of the velocity at which stars are moving away from us. Under the big bang theory, this information can be used to estimate the distance of stars in the universe. In estimating the velocity of stars, light from an individual star was isolated and passed through a prism. The emission spectrum of an element, such as hydrogen, was identified and the apparent shift of one spectral emission component was measured to determine the star's velocity. In this case, the Doppler shift is easily measured since emission spectra consist of the sum of isolated sine waves at precise known frequencies.

A quarter century ago, in "Algorithms for Ambiguity Function Processing" by S. Stein, *IEEE Trans. Acoust., Speech and Signal Processing*, vol. ASSP-29, Stein proposed a method for geolocating emitters from the signals collected by two receivers. In Stein's formulation of the problem, either the transmitter or the receivers are assumed to be moving, and the position and vector velocities of the receivers are assumed to be known. Stein assumed the CAF model in which Doppler is modeled as a translation as a translation in frequency. This application of the CAF was quite clever since knowledge of the time delay and frequency delay between the two received signals resulted in two potentially independent curves representing two possible emitter locations of constant time delay and constant frequency delay, respectively. This is the process currently used in nearly every geolocation application involving two or more receivers. It has been applied to a variety of problems, such as GPS and bistatic radars, in which the reflection from the target are received and processed by two or more radar receivers. Although the Stein formulation accurately represents signals at narrow bandwidth, it models the signal as a sine wave. This is an incorrect assumption for broad bandwidth signals, and therefore, the Stein formulation has significant disadvantages that must be addressed. Despite these drawbacks, many prior art methods continue to rely on the Stein formulation.

U.S. Pat. No. 6,636,174, entitled "SYSTEM AND METHOD FOR DETECTION AND TRACKING OF TARGETS," discloses a method of using a fractional Fourier transform in a CAF to track objects. This method is useful, for example, in radar and sonar systems to find position and estimate the velocity of signals. By altering computations in this method, the signals can be mapped to polar coordinates, as opposed to Cartesian, which is more accurate for certain types of signals. However, it does not address the problems solved by the present invention. U.S. Pat. No. 6,636,174 is hereby incorporated by reference into the present invention.

U.S. patent application Ser. No. 10/996,462, entitled "QUANTUM CROSS-AMBIGUITY FUNCTION GENERATOR," discloses a method of applying quantum mechanics to the traditional cross-ambiguity function to achieve more accurate computations at increased bandwidths for both geo-location and radar applications. The constructed cross-ambiguity function generator, rather than having either an analog or digital construction, has a construction based on the properties of quantum physics based on electro-optical elements. Because the invention is based on different technology than existing systems, the advantages obtained by this invention will require significant investment by current users to implement. Further, it does not solve the problem addressed by the present invention. U.S. patent application Ser. No. 10/996,462 is hereby incorporated by reference into the specification of the present invention.

U.S. patent application Ser. No. 11/180,811, entitled "METHODS FOR DETECTION AND TRACKING OF TARGETS," discloses a method of detecting and tracking targets. Specifically, signals are received and reflected from targets and processed to compute slices of the CAF. These slices are used to find the signal delay and Doppler shift associated with the targets, which facilitates tracking and targeting. This method attempts to solve the problem by only calculating slices of the CAF, thus simplifying computation. This does not result in the improvement in accuracy achieved by the present invention. U.S. patent application Ser. No. 11/180,811 is hereby incorporated by reference into the present invention.

Although prior art methods have been developed for locating and tracking a receiver, specifically in satellite applications, these methods are primarily accurate only in narrow-band applications. Methods that have attempted to account for problems beyond the narrow bandwidth case require extensive modifications to existing equipment, and therefore are impractical for users or manufacturers to implement from both a cost and efficiency standpoint. What is required in the art is a method of processing signals to determine position and velocity of a transmitter accurately over a wide range. of bandwidths.

SUMMARY OF THE INVENTION

It is an object of the present invention to provide a method of determining the position and velocity of a transmitter over a wide range if bandwidths.

It is a further object of the present invention to provide a method of determining the position and velocity of a transmitter over a wide range if bandwidths, wherein the position and velocity are determined using a scalar relationship dependant on the radial velocity of the transmitter with respect to the receiver.

The present invention is a method of signal processing for geolocation of transmitters. The first step of the method is receiving a first signal at a first receiver from a transmitter.

The second step of the method is receiving the signal from the transmitter at a second receiver.

The third step of the method is to model the signals received at the transmitters as a time-scaling of the transmitted signal, composed with a translation.

The fourth step of the method is to express the signal S2 received at the second receiver in terms of the signal $s_1$ received at the first transmitter.

The fifth step of the method is setting $\int s_2^*(\tau+T_1)s_2(\tau+T_1)d\tau = \int s_2^*(\tau+T_1)s_1(b(\tau-\delta)+T_1)d\tau$, where $b=b_2/b_1$.

The sixth step of the method is calculating the ratio of scale factors b of the fifth step 5 in terms of the radial velocities of the receivers relative to the transmitter.

The seventh step of the method is solving the equations of the fifth step 5 of the method to obtain the ratio of scale factors b and the difference delay $\delta$ by calculating (b, $\delta$)=argmax$_{\beta, \Delta}$|$\int S_2^*(\tau)S_1(\beta(\tau-\Delta))d\tau$| for the values of $\beta$ and $\Delta$ which maximize the function following the argmax operator.

The eighth step of the method is finding the value of $(v_2-v_1)/c$ using the equation provided in the sixth step 6 of the method for b.

The ninth step of the method is outputting the values of $\delta$ and $(v_2-v_1)/c$ obtained in the ninth step of the method.

In an alternative embodiment, the equation of the seventh step is normalized and alternative output values are obtained.

DETAILED DESCRIPTION OF THE INVENTION

Figure 1:
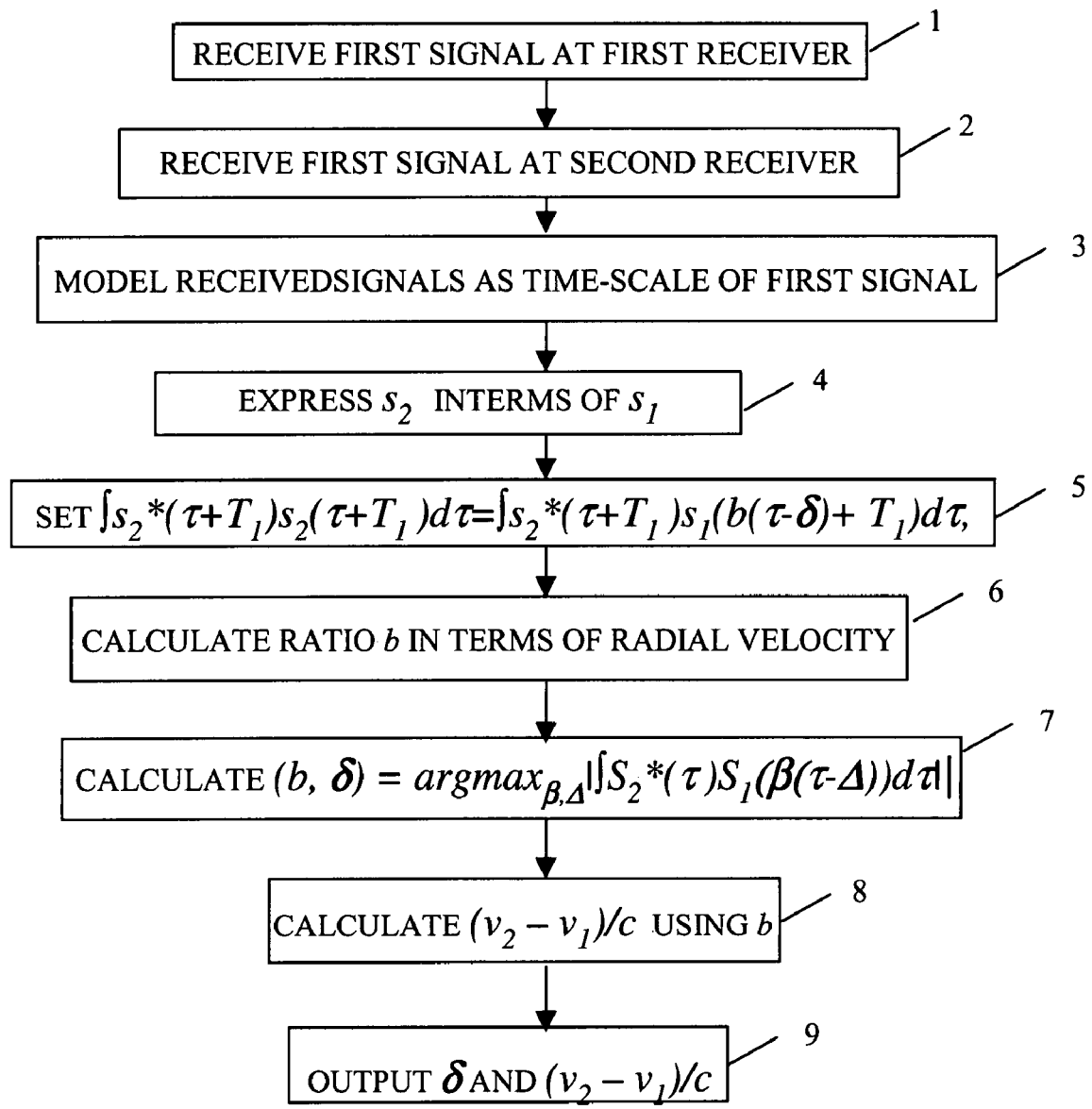
FIG. 1 is a flowchart of the steps of a first embodiment of the invention.

The present invention is a method for determining the location of a transmitter relative to two receivers using a modified CAF technique. The method is useful for geolocation. FIG. 1 provides the steps of a preferred embodiment of the invention. With reference to FIG. 1, the first step 1 of the method is receiving a first signal at a first receiver from a transmitter. Any standard method can be used to receive the signal at the transmitter. Optionally, the receiver and transmitter may be at rest, but in the preferred embodiment the transmitter and receivers are in relative motion. Many methods are known for receiving signals when either the transmitter or receiver are in motion, and any such method can be used in conjunction with the present invention.

The second step 2 of the method is receiving the signal from the transmitter at a second receiver. A second receiver will receive the transmitted signal. In all other aspects, the second step 2 is identical to the first step 1 and therefore will not be discussed in further detail.

The third step 3 of the method is to model the signals received at the transmitters as a time-scaling of the transmitted signal, composed with a translation. This may be justified by expressing the transmitted signal, s(t), as a Fourier series $s(t)=\Sigma_k a_k e^{jkwt}$, where t is the time, w is the fundamental frequency, $\alpha_k$ is the kth Fourier coefficient, and j is the imaginary number whose square is $-1$. Then for i=1,2, applying the standard Doppler-shift to each component of s(t), the signal $s_i(t)$ received at receiver i has the form $s_i(t)=\Sigma_k a_k e^{jkwb_i(t-T_i)}$, where $b_i=1+v_i/c$ is a scale factor, $v_i$ is the relative radial velocity of the transmitter and the ith receiver, $T_i$ is the propagation delay between the transmitter and the ith receiver, and c is the speed of light. Comparing $s_i(t)$ with s(t) shows that $s_i(t)=s(b_i(t-T_i))$. Modeling the received signals as time-scaled versions of the transmitted signal is a more accurate representation than modeling the received signals as doppler-shifts of a single carrier, as is done for the standard CAF model. This scale modeling also allows the transmitted signal to be wide-band, which removes the standard CAF restriction that the transmitted signal has a single dominant carrier frequency.

The fourth step 4 of the method is to express the signal $s_2$ received at the second receiver in terms of the signal $s_1$ received at the first transmitter. This may be done by algebraically manipulating the scale relations $s_i(t)=s(b_i(t-T_i))$ of step 3 to obtain $s_2(t+T_1)=s_1((b_2/b_1)(t-\delta)+T_1)$ where $\delta=T_2-T_1$ and $\delta$ is the difference delay. Performing the above mathematical calculations is straightforward for those skilled in the art and will not be discussed in detail.

The fifth step 5 of the method is setting $\int s_2^*(\tau+T_1)s_2(\tau+T_1)d\tau=\int s_2^*(\tau+T_1)s_1(b(\tau-\delta)+T_1)d\tau$, where $b=b_2/b_1$. Further, by defining $S_i(\tau)=s_i(\tau+T_1)$ for all $\tau$, the integral equation becomes $\int S_2^*(\tau)S_2(\tau)d\tau=\int S_2^*(\tau)S_1(b(\tau-\delta))d\tau$. This observation will be used below to determine numerical estimates of $\delta$ and b.

The sixth step 6 of the method is calculating the ratio of scale factors b of the fifth step 5 in terms of the radical velocities of the receivers relative to the transmitter. Thus $b=b_2/b_1=(v_2-v_1)/c$ to first order in ratios of radical velocities to the speed of light. The difference in radical velocities and the difference delay $\delta=T_2-T_1$ may be used for geolocation of the transmitter through methods well known in the art. As noted above, because a time scale factor is used, this method does not depend on the transmitted signal type, and therefore can be used for any bandwidth signal. This is a significant improvement over prior art methods.

The seventh step 7 of the method is solving the equations of the fifth step 5 of the method to obtain the ratio of scale factors b and the difference delay $\delta$ by calculating (b, $\delta$)=argmax$_{\beta, \Delta}$|$\int S_2^*(\tau)S_1(\beta(\tau-\Delta))d\tau$| for the values of $\beta$ and $\Delta$ which maximize the function following the argmax operator. As is known in the art, argmax is the "argument of the maximum" operation, which is used to find the arguments which give the maximum value of the function following the argmax operator. In the given case, the argmax operator is used to find estimates of the values b and $\delta$. Applying an argmax operation is well known in the art. To find the maximum values, putative values of $\beta$ and $\tau$ are input into the equation until a maximum value is found for the result of the absolute value of the integral. The values of $\beta$ and $\tau$ maximizing the absolute value of the integral are taken as the estimated values of b and $\delta$. As is further known in the art, the symbol * represents the performance of the complex conjugate operation. Performance of such an operation is well known to those of skill in the art.

The problem in computing the scale CAF is that one must compute the value of the surface for several values of scale, $\beta$, and delay, $\tau$. We can compute the scale transform for a particular value of $\beta$ and multiple values of $\tau$ using the discrete Fourier transform:

$$S_i[k] = \sum_{n=0}^{N-1} s_i[n]e^{-2\pi i n/N}, k = 1 \ldots N$$

where $s_i[n]$ is the i-th sampled signal. This calculation can be accomplished as follows. First, the discrete Fourier transform, $<S_1[k]>$, of an $N_1$ length vector of the first signal, $s_1[n]$ is computed. $<S_1[k]>$ is, therefore, a vector of length $N_1$. Next, the discrete Fourier transform, $<S_2[k]>$, of an $N_2$ length vector of the second signal, $s_2[n]$ is computed. $<S_2[k]>$ is, therefore, a vector of length $N_2$. Third, the shorter of the computer discrete Fourier transforms resulting from the two operations, $<S_1[k]>$ and $<S_2[k]>$, are zero-filled by inserting zeros into the middle of the shorter discrete Fourier transform. The cross-spectrum, $<S_1[k]S_2^*[k]>$, is then formed. Finally, the inverse discrete Fourier transform of the cross-spectrum is computed. The vector resulting from the calculation of the inverse is the scale CAF of the first signal, $s_1[k]$, and the second signal, $s_2[k]$, at scale, $\beta$, equal to the ratio of $N_1$ and $N_2$ and multiple delays, $\tau$.

The eighth step 8 of the method is finding the value of $(v_2-v_1)/c$ using the equation provided in the sixth step 6 of the method for b. The values of $(v_2-v_1)/c$ and $\delta$ may be used by those skilled in the art to geolocate the transmitter.

The ninth step 9 of the method is outputting the values of δ and $(v_2-v_1)/c$ obtained in the ninth step of the method. The values can be output through any conventional means, such as displaying the values to a computer monitor, or any other conventional method.

Figure 2:
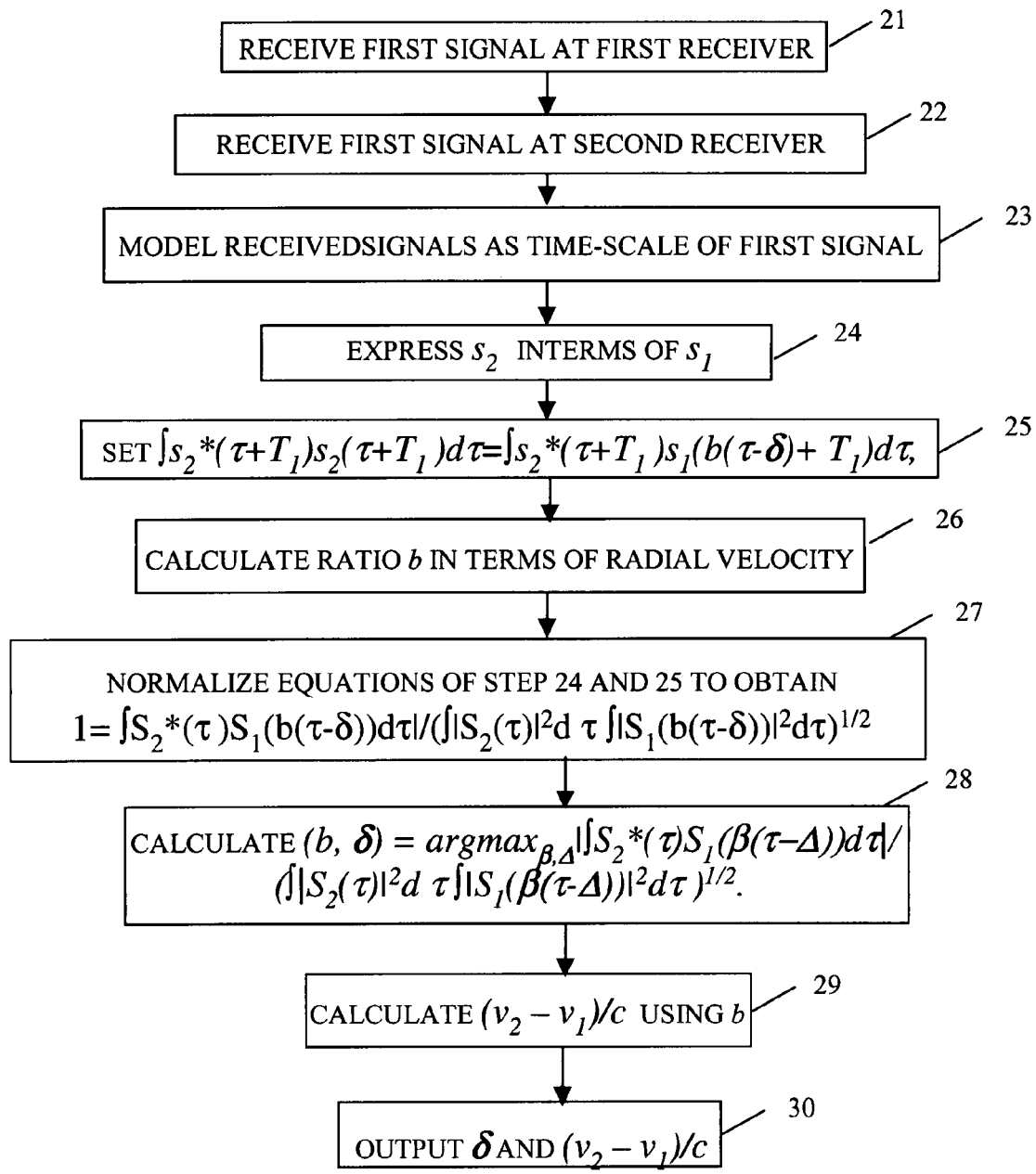
FIG. 2 is a flowchart of the steps of an alternative embodiment of the invention.

An alternative embodiment of the invention is shown in FIG. 2. With reference to FIG. 2, the first step 21 of the method is receiving a first signal at a first receiver from a transmitter. As with the first embodiment, any standard method can be used to receive the signal at the transmitter. Optionally, the receiver and transmitter may be at rest, but in the preferred embodiment the transmitter and receivers are in relative motion. Many methods are known for receiving signals when either the transmitter or receiver are in motion, and any such method can be used in conjunction with the present invention.

The second step 22 of the method is receiving the signal from the transmitter at a second receiver. Again, a second receiver will receive the transmitted signal. In all other aspects, the second step 22 is identical to the first step 21 and therefore will not be discussed in further detail.

The third step 23 of the method is to model the signals received at the transmitter as a time-scaling of the transmitted signal, composed with a translation. This may be justified by expressing the transmitted signal, s(t), as a Fourier series $s(t)=\Sigma_k a_k e^{jkwt}$, where t is the time, w is the fundamental frequency, $a_k$ is the kth Fourier coefficient, and j is the imaginary number whose square is −1. Then for i=1,2, applying the standard Doppler-shift to each component of s(t), the signal $s_i(t)$ received at receiver i has the form $s_i(t)=\Sigma_k a_k e^{jkwb_i(t-T_i)}$, where $b_i=1+v_i/c$ is a scale factor, $v_i$ is the relative radial velocity of the transmitter and the ith receiver, $T_i$ is the propagation delay between the transmitter and the ith receiver, and c is the speed of light. Comparing $s_i(t)$ with s(t) shows that $s_i(t)=s(b_i(t-T_i))$. Modeling the received signals as time-scaled versions of the transmitted signal is a more accurate representation than modeling the received signals as doppler-shifts of a single carrier, as is done for the standard CAF model. This scale modeling also allows the transmitted signal to be wide-band, which removes the standard CAF restriction that the transmitted signal has a single dominant carrier frequency.

The fourth step 24 of the method is to express the signal $s_2$ received at the second receiver in terms of the signal $s_1$ received at the first transmitter. This may be done by algebraically manipulating the scale relations $s_i(t)=s(b_i(t-T_i))$ of step 23 to obtain $s_2(t+T_1)=s_1((b_2/b_1)(t-\delta)+T_1)$ where $\delta=T_2-T_1$ is the difference delay. Performing the above mathematical calculations is straightforward for those skilled in the art and will not be discussed in detail.

The fifth step 25 of the method is setting $\int s_2^*(\tau+T_1)s_2(\tau+T_1)d\tau = \int s_2^*(\tau+T_1)s_1(b(\tau-\delta)+T_1)d\tau$, where $b=b_2/b_1$. Further, by defining $S_i(\tau)=s_i(\tau+T_1)$ for all τ, the integral equation becomes $\int S_2^*(\tau)S_2(\tau)d\tau = \int S_2^*(\tau)S_1(b(\tau-\delta))d\tau$. This observation will be used below to obtain estimates of b and δ.

The sixth step 26 of the method is calculating the ratio of scale factors b of the fifth step 25 in terms of the radial velocities of the receivers relative to the transmitter. Thus $b=b_2/b_1=(v_2-v_1)/c$ to first order in ratios of radial velocities to the speed of light. The difference in radial velocities and the difference delay $\delta=T_2-T_1$ may be used for geolocation of the transmitter through methods well known in the art.

The seventh step 27 of the method is normalizing the equations of the fifth step 25 of the method to obtain $1 = \int S_2^*(\tau)S_1(b(\tau-\delta))d\tau / (\int |S_2(\tau)|^2 d\tau \int |S_1(b(\tau-\delta))|^2 d\tau)^{1/2}$.

The eighth step 28 of the method is solving the normalized equation of the seventh step 27 for b and δ by calculating (b, δ) = $\mathrm{argmax}_{\beta,\Delta} |\int S_2^*(\tau)S_1(\beta(\tau-\Delta))d\tau| / (\int |S_2(\tau)|^2 d\tau \int |S_1(\beta(\tau-\Delta))|^2 d\tau)^{1/2}$. As was discussed in detail above, argmax is the "argument of the maximum" operation, which is used to find the maximum value of the argument following the argmax operation. In the given case, the argmax operation is used to find the maximum value of b and δ. Performance of an argmax operation is well known in the art.

The ninth step 29 of the method is finding the value of $(v_2-v_1)/c$ using the equation provided in the sixth step 26 of the method for b. The values of $(v_2-v_1)/c$ and δ may be used by those skilled in the art to geolocate the transmitter.

The tenth step 30 of the method is outputting the values of b and $(v_2-v_1)/c$ obtained in the ninth step of the method. The values can be output to a computer screen, or any other conventional method of display can be used.

What is claimed is:

1. A method of geolocating a transmitter, comprising the steps of:
   a) receiving a first wideband signal at a first receiver from transmitter, where the first signal received at the first receiver is designated as $s_1$;
   b) receiving the first signal at a second receiver from the transmitter, where the first signal received at the second receiver is designated as $s_2$;
   c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver comprising the steps of:
      i) determining, digitally, values for user-definable variables β and Δ that maximize $|\int S_2^*(\tau)S_1(\beta(\tau-\Delta))d\tau|$, where $S_1(\tau)=s_1(\tau+T_1)$, where $S_2(\tau)=s_2(\tau+T_1)$, where $S_2^*$ is the complex conjugation of $S_2$, and where τ is a user-definable time;
      ii) setting δ equal to the value determined for variable Δ in step (i); and
      iii) setting $(T_2-T_1)$ equal to δ; and
   d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter; and
   e) geolocating the transmitter using the results of step (c) and (d).

2. A method of geolocating a transmitter, comprising the steps of:
   a) receiving a first wideband signal at a first receiver from transmitter, where the first signal received at the first receiver is designated as $s_1$;
   b) receiving the first signal at a second receiver from the transmitter, where the first signal received at the second receiver is designated as $s_2$;
   c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver;
   d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter comprising the steps of:

i) determining, digitally, values for user-definable variables $\beta$ and $\Delta$ that maximize $|\int S_2^*(\tau)S_1(\beta(\tau-\Delta))d\tau|$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time;

ii) setting scale factor b equal to the value determined for variable $\beta$ in step (i);

iii) multiplying b and c, where c is the speed of light; and e) geolocating the transmitter using the results of step (c) and step (d).

3. A method of geolocating a transmitter, comprising the steps of:

a) receiving a first wideband signal at a first receiver from transmitter, where the first signal received at the first receiver is designated as $s_1$;

b) receiving the first signal at a second receiver from the transmitter, where the first signal received at the second receiver is designated as $s_2$;

c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver comprising the steps of:

i) determining, digitally, values for user-definable variables $\beta$ and $\Delta$ that maximize $|\int S_2^*(\tau)S_1(\beta(\tau-\Delta))d\tau|/(\int|S_2(\tau)|^2d\tau\int|S_1(\beta(\tau-\Delta))|^2d\tau)^{1/2}$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time;

ii) setting $\delta$ equal to the value determined for variable $\Delta$ in step (i); and iii) setting $(T_2-T_1)$ equal to $\delta$; and d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter; and e) geolocating the transmitter using the results of step (c) and step (d).

4. A method of geolocating a transmitter, comprising the steps of:

a) receiving a first wideband signal at a first receiver from transmitter, where the first signal received at the first receiver is designated as $s_1$;

b) receiving the first signal at a second receiver from the transmitter, where the first signal received at the second receiver is designated as $s_2$;

c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver;

d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter comprising the steps of:

i) determining, digitally, values for user-definable variables $\beta$ and $\Delta$ that maximize $|\int S_2^*(\tau)S_1(\beta(\tau-\Delta))d\tau|/(\int|S_2(\tau)|^2d\tau\int|S_1(\beta(\tau-\Delta))|^2d\tau)^{1/2}$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time;

ii) setting scale factor b equal to the value determined for variable $\beta$ in step (i);

iii) multiplying b by c, where c is the speed of light; and e) geolocating the transmitter using the results of step (c) and step (d).

5. A method of geolocating a transmitter, comprising the steps of:

a) receiving a first wideband signal at a first receiver from transmitter, where the first signal received at the first receiver is designated as $s_1$;

b) receiving the first signal at a second receiver from the transmitter, where the first signal received at the second receiver is designated as $s_2$;

c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver comprising the steps of:

i) determining values for user-definable variables $\beta$ and $\Delta$ that maximize $|\int S_2^*(\tau)S_1(\beta(\tau-\Delta))d\tau|$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time comprising the steps of;

a. selecting a user-definable value for $\beta$;

b. selecting positive integers $N_1$ and $N_2$ such that $\beta=N_1/N_2$;

c. converting $s_1$ into a user-definable number of digital samples;

d. selecting $N_1$ contiguous digital samples from the result of step c;

e. computing a discrete Fourier transform of the result of step d;

f. converting $s_2$ into a user-definable number of digital samples;

g. selecting $N_2$ contiguous digital samples from the result of step f;

h. computing the discrete Fourier transform of the result of step g;

i. computing the complex conjugate of the result of step h;

j. padding the shorter result of step e and step h with zeros to match the length of the longer result of step e and step h;

k. multiplying the results of step h and step i;

l. computing the Inverse Discrete Fourier Transform of the result of step k to obtain values of $\int S_2^*(\tau)S_1(\beta(\tau-\Delta))d\tau$ for all possible discrete values of $\Delta$;

m. changing the value of $\beta$ a user-definable amount and returning to step b if additional processing is desired; and n. determining the values of $\beta$ and $\Delta$ that maximized the value of $\int S_2^*(\tau)S_1(\beta(\tau-\Delta))d\tau$;

ii) setting $\delta$ equal to the value determined for variable $\Delta$ in step (i); and iii) setting $(T_2-T_1)$ equal to $\delta$;

d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter; and e) geolocating the transmitter using the results of step (c) and step (d).

6. A method of geolocating a transmitter, comprising the steps of:
- a) receiving a first wideband signal at a first receiver from transmitter, where the first signal received at the first receiver is designated as $s_1$;
- b) receiving the first signal at a second receiver from the transmitter, where the first signal received at the second receiver is designated as $s_2$;
- c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver;
- d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter comprising the steps of:
  - i) determining values for user-definable variables $\beta$ and $\Delta$ that maximize $|\int S_2^*(\tau)S_1(\beta(\tau-\Delta))d\tau|$, where $S_2(\tau)=s_2(\tau+T_1)$, where $S_2^*$ is the complex conjugation of $S_2$, and where $\tau$ is a user-definable time comprising the steps of:
    - a. selecting a user-definable value for $\beta$;
    - b. selecting positive integers $N_1$ and $N_2$ such that $\beta=N_1/N_2$;
    - c. converting $s_1$ into a user-definable number of digital samples;
    - d. selecting $N_1$ contiguous digital samples from the result of step c;
    - e. computing a discrete Fourier transform of the result of step d;
    - f. converting $s_2$ into a user-definable number of digital samples;
    - g. selecting $N_2$ contiguous digital samples from the result of step f;
    - h. computing the discrete Fourier transform of the result of step g;
    - i. computer the complex conjugate of the result of step h;
    - j. padding the shorter result of step e and step h with zeros to match the length of the longer result of step e and step h;
    - k. multiplying the results of step h and step i;
    - l. computing the Inverse Discrete Fourier Transform of the result of step k to obtain values of $\int S_2^*(\tau)S_1(\beta(\tau-\Delta))d\tau$ for all possible discrete values of $\Delta$;
    - m. changing the value of $\beta$ a user-definable amount and returning to step b if additional processing is desired; and
    - n. determining the values of $\beta$ and $\Delta$ that maximized the value of $\int S_2^*(\tau)S_1(\beta(\tau-\Delta))d$;
  - ii) setting scale factor b equal to the value determined for variable $\beta$ in step (i);
  - iii) multiplying b by c, where c is the speed of light; and
  - iv) setting $(V_2-V_1)$ equal to the result of step (iii); and
- e) geolocating the transmitter using the results of step (c) and step (d).

7. A method of geolocating a transmitter, comprising the steps of:
- a) receiving a first wideband signal at a first receiver from transmitter, where the first signal received at the first receiver is designated as $s_1$;
- b) receiving the first signal at a second receiver from the transmitter, where the first signal received at the second receiver is designated as $s_2$;
- c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver comprising the steps of:
  - i) determining values for user-definable variables $\beta$ and $\Delta$ that maximize $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time comprising the steps of:
    - a. selecting a user-definable value for $\beta$;
    - b. selecting positive integers $N_1$ and $N_2$ such that $\beta=N_1/N_2$;
    - c. converting $s_1$ into a user-definable number of digital samples;
    - d. selecting $N_1$ contiguous digital samples from the result of step c;
    - e. computing a discrete Fourier transform of the result of step d;
    - f. converting $s_2$ into a user-definable number of digital samples
    - g. selecting $N_2$ contiguous digital samples from the result of step f;
    - h. computing the discrete Fourier transform of the result of step g;
    - i. compute the complex conjugate of the result of step h;
    - j. padding the shorter result of step e and step h with zeros to match the length of the longer result of step e and step h;
    - k. multiplying the results of step h and step i;
    - l. computing the Inverse Discrete Fourier Transform of the result of step k to obtain values of $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$ for all possible discrete values of $\Delta$;
    - m. changing the value of $\beta$ a user-definable amount and returning to step b if additional processing is desired; and
    - n. determining the values of $\beta$ and $\Delta$ that maximized the value of $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$; and
  - ii) setting $\delta$ equal to the value determined for variable $\Delta$ in step (i); and
  - iii) setting $(T_2-T_1)$ equal to $\delta$,
- d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter; and
- e) geolocating the transmitter using the results of step (c) and step (d).

8. A method of geolocating a transmitter, comprising the steps of:
- a) receiving a first wideband signal at a first receiver from transmitter, where the first signal received at the first receiver is designated as $s_1$;
- b) receiving the first signal at a second receiver from the transmitter, where the first signal received at the second receiver is designated as $s_2$;
- c) calculating a difference $(T_2-T_1)$ in propagation delays between the transmitter and the first receiver and the second receiver, where $T_1$ is the propagation delay from the transmitter to the first receiver, and where $T_2$ is the propagation delay from the transmitter to the second receiver;

d) calculating a difference in radial velocities $(V_2-V_1)$ of the receivers relative to the transmitter using a scale factor b based on time of the received signal, where $V_1$ is the radial velocity of the first receiver relative to the transmitter, and where $V_2$ is the radial velocity of the second receiver relative to the transmitter comprising the steps of:

i) determining values for user-definable variables $\beta$ and $\Delta$ that maximize $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$, where $S_1(\tau)=s_1(\tau+T_1)$, where $S_2(\tau)=s_2(\tau+T_1)$, where $S_2^*$ is the complex conjugation of $S_2$, and where $\tau$ is a user-definable time comprising the steps of:
  a. selecting a user-definable value for $\beta$;
  b. selecting positive integers $N_1$ and $N_2$ such that $\beta=N_1/N_2$;
  c. converting $s_1$ into a user-definable number of digital samples;
  d. selecting $N_1$ contiguous digital samples from the result of step c;
  e. computing a discrete Fourier transform of the result of step d;
  f. converting $s_2$ into a user-definable number of digital samples;
  g. selecting $N_2$ contiguous digital samples from the result of step f;
  h. computing the discrete Fourier transform of the result of step g;
  i. computer the complex conjugate of the result of step h;
  j. padding the shorter result of step e and step h with zeros to match the length of the longer result of step e and step h;
  k. multiplying the results of step h and step i;
  l. computing the Inverse Discrete Fourier Transform of the result of step k to obtain values of $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$ for all possible discrete values of $\Delta$;
  m. changing the value of $\beta$ a user-definable amount and returning to step b if additional processing is desired; and
  n. determining the values of $\beta$ and $\Delta$ that maximized the value of $|\int S_2^*(\tau)S_1(\beta(\tau-\Delta))d\tau|/(\int |S_2(\tau)|^2 d\tau \int |S_1(\beta(\tau-\Delta))|^2 d\tau)^{1/2}$; and ii) setting scale factor b equal to the value determined for variable $\beta$ in step (i);
iii) multiplying b by c, where c is the speed of light; and
iv) setting $(V_2-V_1)$ equal to the result of step (iii); and e) geolocating the transmitter using the results of step (c) and step (d).

* * * * *